United States Patent [19]
Dighe et al.

[11] Patent Number: 5,530,695
[45] Date of Patent: Jun. 25, 1996

[54] UPC-BASED TRAFFIC CONTROL FRAMEWORK FOR ATM NETWORKS

[75] Inventors: Rajiv Dighe, Princeton Junction; Gopalakrishnan Ramamurthy, Cranbury; Dipankar Raychaudhuri, Princeton Junction, all of N.J.

[73] Assignee: NEC USA, Inc., Princeton, N.J.

[21] Appl. No.: 167,337

[22] Filed: Dec. 15, 1993

[51] Int. Cl.⁶ .......................... H04L 12/26; H04L 12/56
[52] U.S. Cl. ............................ 370/17.000; 370/60.1; 370/94.2
[58] Field of Search .................. 370/13, 17, 60, 370/60.1, 94.1, 94.2, 94.3, 110.1, 85.6; 340/825.5, 825.51; 870/79, 85.7, 95.1

[56] References Cited

U.S. PATENT DOCUMENTS

| | | | |
|---|---|---|---|
| 5,029,164 | 7/1991 | Goldstein et al. | 370/95.1 |
| 5,153,877 | 10/1992 | Esaki et al. | 370/94.1 |
| 5,166,894 | 11/1992 | Saito | 370/94.1 |
| 5,179,556 | 1/1993 | Turner | 370/94.1 |
| 5,280,483 | 1/1994 | Kamoi et al. | 370/60 |
| 5,289,462 | 2/1994 | Ahmadi et al. | 370/94.1 |
| 5,313,454 | 3/1994 | Bustini et al. | 370/13 |
| 5,339,332 | 8/1994 | Kammerl | 370/13 |
| 5,357,507 | 10/1994 | Hughes et al. | 370/60 |

OTHER PUBLICATIONS

G. Ramamurthy, et al, "A Multidimensional Framework for Congestion Control in B–ISDN", IEEE Journal on Selected Areas in Communications, vol. 9, No. 9, Dec. 1991.

*Primary Examiner*—Hassan Kizou
*Attorney, Agent, or Firm*—Philip J. Feig

[57] ABSTRACT

An asynchronous transfer mode (ATM) traffic control framework is based on an integrated usage parameter control (UPC) approach, which approach provides a unified and scalable solution to the issue of quality-of-services (QOS) levels over a range of anticipated services in ATM based networks. The approach is consistent with emerging ATM Forum and CCITT standards. Additionally, a UPC-based call and burst admission control providing the desired QOS over periods of network overload by call/burst admission control and traffic shaping of source stream preferably uses a dual leaky bucket.

2 Claims, 4 Drawing Sheets

UPC-BASED TRAFFIC CONTROL FRAMEWORK FOR ATM NETWORKS

BACKGROUND OF INVENTION

The present invention relates to an asynchronous transfer mode (ATM) traffic control framework based on an integrated usage parameter control (UPC) approach. Specifically, the UPC approach provides a unified and scalable solution to the issue of quality-of-service (QOS) levels both over a range of anticipated services and during periods of network overload.

Future broadband networks will be required to support new bandwidth intensive applications such as full motion video, teleconferencing, interactive multimedia, medical imaging, scientific visualization, distributed computing, distributed simulation, client server traffic, etc. These applications will place varying requirements in terms of the quality-of-service they receive from the network. Asynchronous transfer mode (ATM) technology is now viewed as the primary switching and transport technology for emerging high-speed networks, both in wide-area and local-area scenarios. While ATM offers the ability to support a range of multi-rate services in an integrated manner, technical approaches for maintaining quality-of-service in dynamic and heterogeneous traffic environments require further development and standardization.

In spite of the the promise of abundant bandwidth, ATM may not be able to satisfactorily support many QOS sensitive services unless appropriate dynamic traffic control is exercised by the network. The underlying philosophy of ATM networking is fast generic cell transport with simple switching nodes that scale easily with line speed and number of ports. The cell-level control in these nodes is generally quite minimal to avoid complex high-speed processing. Application specific switching node architectures are considered to be neither desirable nor necessary. The lack of strong cell level controls at each ATM switching node, coupled with the fact that ATM based switches have a limited amount of buffering (due to technological as well as scaling limitations), can result in traffic hot spots and other congestion related problems within the network. Further, the cell-based nature of the transport can result in server performance degradation under over-load due to cell loss and consequent retransmission of data.

The applications anticipated in broadband networks have traffic characteristics that are very different from those of current applications. Many of these applications require rapid movement of large quantities of data across the network, which can overwhelm the buffers in the ATM switches, resulting in cell loss. Further, the cell-based nature of the transport can result in severe performance degradation under overload due to cell loss and consequent retransmission of data. While providing more memory in the network may temporarily alleviate the problem, it does not lead to a scalable solution. For example, FIG. 1 shows the performance of an ATM multiplexer (without link level controls), that multiplexes traffic from 16 FDDI routers. Each router has an access rate of 100 Mbits/second to the ATM multiplexer, and the FDDI packets have an average size of 4 Kbytes. Even at utilizations as low as 60%, and with a buffer size of 200 cells, the frame loss rate is of the order of $1.0 \times 10^{-1}$, which would be unacceptable for most data applications. With a larger buffer size of 1000 cells the frame loss rate is of the order of $1.0 \times 10^{-3}$. Thus additional buffers do not mitigate the problem. Controlled movement of data across the network is essential to ensure high throughput and low loss.

SUMMARY OF THE INVENTION

The present invention concerns a traffic control framework for ATM, that would maintain specified QOS levels over a range of anticipated services. Central to this framework is a classification scheme that maps applications to specific traffic classes based on their QOS requirements and the statistical characteristics of their traffic. Attached to each traffic class is a minimum QOS guarantee. The primary objective of the proposed traffic control framework is to ensure that the desired QOS is maintained during periods of network overload, both short and long-term. The framework is based on a pro-active philosophy of controlling sources (via UPC-based traffic shaping) to avoid network congestion, while still operating the network in the low loss/high utilization region. The UPC-based control depends upon a minimum set of control functions to handle a wide range of traffic types. Further, the same set of traffic parameters is used to describe the traffic characteristics of all classes. Specifically, this aspect of the invention uses cell-based admission control policy based on the UPC parameters. The framework however is backed by reactive controls to protect the network, in the event an occasional short-term traffic overload occurs. The proposed traffic control framework can work across LANs, MANs, WANs, private and public networks in a seamless manner. The controls are designed to scale with distance, traffic volume and traffic type.

A principal feature of this framework is that it depends on a minimum set of control functions to handle a wide range of traffic types. Further, the same set of traffic parameters is used to describe the traffic characteristics of all classes.

Another important feature of this framework is that it only uses parameters for control that have already been standardized by CCITT and the ATM Forum without needing more statistical information from the users.

The present invention concerns only one possible approach, and it will be apparent to those skilled in the art that many alternative approaches ranging from no control to per virtual circuit (VC) control are now under discussion in standards forums. It is recognized that traffic shaping at each UNI (user network interface) may be considered too expensive in certain LAN or private WAN scenarios, which may choose to rely on mechanisms such as link-by-link backpressure using large buffers or backward error congestion notification (BECN) indication. However, this approach (or variations of it) may become necessary to address the issue of interfacing private ATM networks to public ATM/B-ISDN, in which traffic shaping and QOS guarantees are expected to be mandatory.

Further features of the invention will become more clearly apparent when the forthcoming description is read in conjunction with the accompanying drawings.

DETAILED DESCRIPTION OF THE INVENTION

Figure 1:
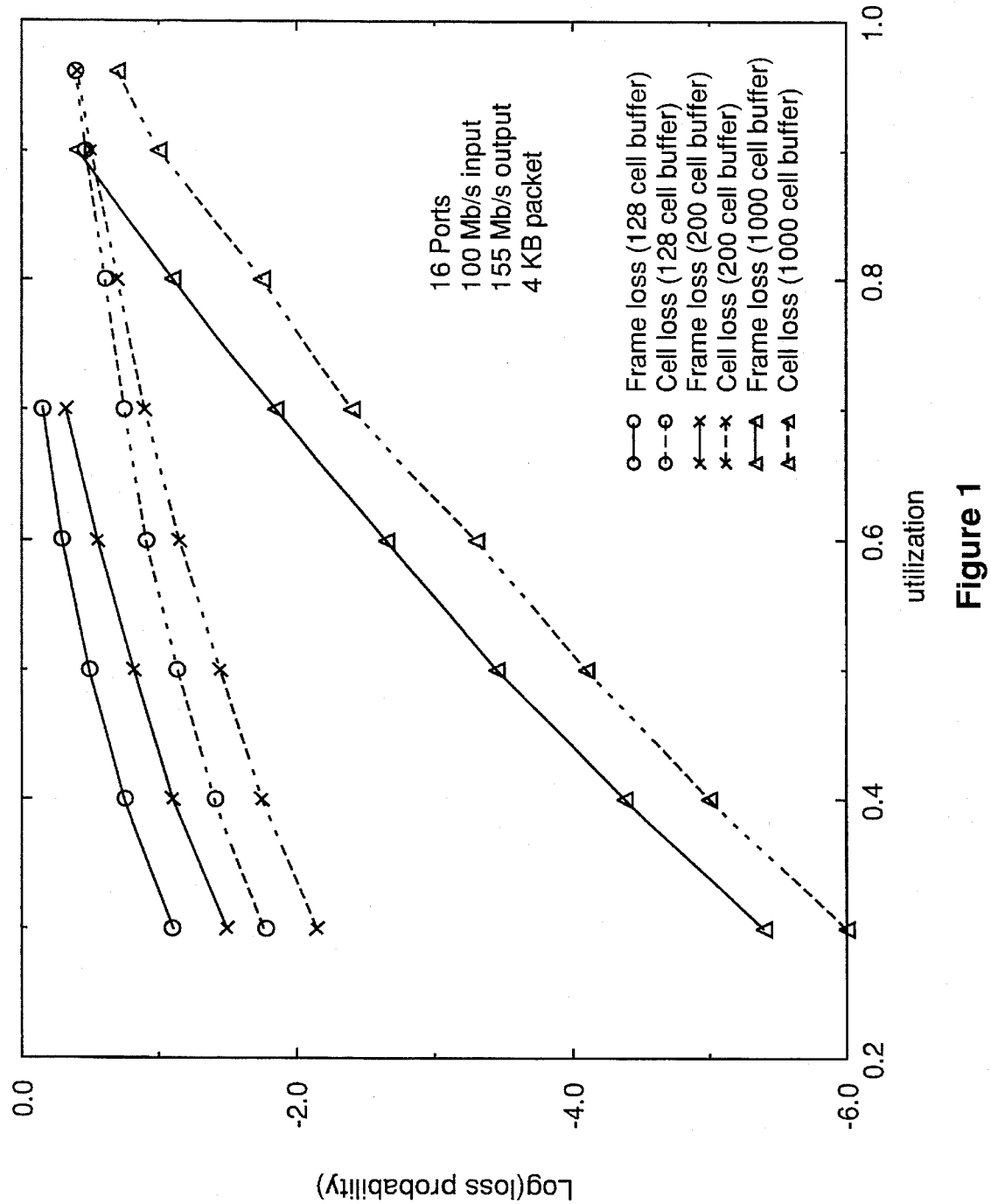
FIG. 1 is a graphical representation of the upper bounds on cell and frame loss probabilities for FDDI inputs.

The ATM network will be able to provide guarantees on the offered quality of service only if it has a reasonable description of characteristics of the offered traffic. Hence traffic descriptors that describe the characteristics of the offered traffic, and policing mechanisms that ensure conformance with the declared traffic parameters are essential. Traffic classification simplifies the task of QOS management. It also helps to provide various levels of performance guarantees based on the applications need. Once the characteristics of the source and their required QOS are known, the network can use appropriate admission control policies to accept or deny service to new requests wanting to use the services of the network.

In the framework under consideration traffic classification is based on traffic characteristics of the offered load and QOS requirements. The framework is based on the assumption that traffic management on a per-class basis is more realistic than traffic management on a per connection or per virtual channel basis. It is assumed that the service provider will define a set of M classes of service. Each class of service is targeted towards a set of specific applications, whose traffic characteristics and QOS requirements from the network are similar. Associated with each class m(m=1,2, ..., M) is a traffic parameter vector $\overline{\alpha}_m = (\alpha_{m1}, \alpha_2, ...)$ and a QOS vector $\overline{\beta}_m = (\beta_{m1}, \beta_{m2}, ...)$. The traffic parameter represents the traffic characteristic of sources that subscribe to a given service class. Elements of the traffic parameter vector will be quantities such as the peak rate, burst size, etc. Preferably, the traffic parameter vector is assumed to be the same as the traffic shaping vector defined by the ATM Forum. This is based on the dual-leaky bucket filter. The QOS vector represents the guarantees that are offered on particular service. These guarantees are statistical, and are offered on a class basis rather than on an individual connection basis. Elements of the QOS vector will be network related performance measures such as cell loss, delay, etc. The number of such service classes should be sufficiently inclusive to encompass all foreseeable needs of customers, but small enough to keep the problem simple and manageable. Associated with each service class offering is a qualitative description of the service, the range of applications it can handle, the parameters that would describe the source characteristics and how to choose them, and the maximum value the parameters can assume for the given class (i.e., $\overline{\alpha}_m^{max} = \alpha_{m1}^{max}, \alpha_{m2}^{max}, ...$).

The selection of a particular traffic class for a given application is performed with the help of an application programming interface (API). Once a service class is chosen by a source, the network monitors the source for the declared traffic parameters (if one has been declared) or monitors the maximum or default parameter values of the chosen service (if no parameters were declared), and takes appropriate action on those sources exceeding this constraint. As long as the source parameters are within the maximum or default values, the desired quality of service is guaranteed (in fact it could be better but never worse). If the user chooses the wrong class, then there may be a degraded level of performance, at which point the user would make an alternative choice. The principal advantage of this approach is that the users are relieved of the burden of precisely characterizing their sources. For the network provider, the result is a more manageable problem. Further, policing, scheduling, and resource allocation policies can be tuned for each class, and thereby improve network efficiency while maintaining the required QOS.

Based on the anticipated traffic characteristics and the performance expected from the network by future applications, five generic service classes for ATM are considered. While each of these traffic classes is designed to handle a range of traffic parameters, they provide performance guarantees on a statistical basis common to all the traffic that subscribe to a given class. This approach makes the traffic more predictable from the network point of view. Once the traffic becomes predictable (by imposing appropriate constraints—in terms of shaping the traffic, and regulating their admission), it is possible to devise scheduling mechanisms and resource management strategies that ensure that the desired QOS for all service classes are met while network resources are efficiently used. Table 1 lists the five traffic classes along with typical applications and their QOS requirements. Class 1 and class 2 are connection oriented services that can support services with real-time requirements, such as voice and video applications. Class 3 to 5, are intended to support data applications that do not have the same constraints as real time traffic (class 1 and 2). Note that the last three classes can support both connection oriented as well as connection-less services.

TABLE 1

| Traffic Class | Traffic Type | Application | QOS Requirements |
|---|---|---|---|
| Class 1 | CBR Connection-oreiented (CO) | Voice, video, ... | Isochronous low cell loss low delay low delay jitter |
| Class 2 | VBR Connection-oriented | Video, multimedia | Low delay low delay jitter moderate cell loss statistical Mux |
| Class 3 | Statistical data traffic Connection-less (CL) | interactive data client server app. Best effort service | low cell loss moderate latency |
| Class 4 | Low latency CL | Distributed computing distributed simulation remote paging | low loss low latency high throughput |
| Class 5 | Bulk data CO/CL | File transfers Image retrievals | High throughput low loss Moderate latency |

The Control framework is also based on a set of temporal controls that are hierarchically arranged based on the time constants of events controlled. These can be classified as: call level controls, burst level controls, and cell level controls. The controls at the call level and burst level control admission of new calls or new bursts. Their control parameters are based on the dual leaky bucket parameters recommended by the ATM forum for implementation at the public user network interface (UNI). Their main function is to shape traffic and check conformance with the declared UPC parameters in order to ensure the required QOS requirements can be met by the network. The controls are based on a fast resource allocation protocol [FRP] to ensure low latency and high utilization. The cell level controls may include: an aggregate back pressure control between switches (on a per class basis), a per virtual channel (VC) control based on the FECN [forward error congestion notification] bit in the ATM header, class based scheduling, buffer and bandwidth management policies at each switch, or fire walls between traffic classes to minimize interaction. This assumes that the bandwidth is partitioned dynamically between the different classes of traffic. It is also possible to use some form of asynchronous time sharing of bandwidth at the cell level between the different traffic classes to ensure that the QOS of each class is guaranteed and the resource utilization is kept high. The QOS guarantees are provided on a class basis rather than on an individual connection basis.

The present invention is primarily concerned with the use of the UPC function at the UNI (and the complementary shaping function at the CPE) to perform the following functions:

1. A Call Admission Control (CAC) policy based on resource allocation and a guaranteed QOS for a class of traffic.
2. Fast Burst Access Control (BAC) to accept or deny bursts on a burst-by-burst basis and guarantee a given QOS for certain classes of traffic.
3. Allocation and de-allocation of network resources based on the state of the virtual channels (VC) connection by using a simple extension to the standard dual-leaky bucket implementation. This results in better statistical multiplexing gains in the network.

The usage parameter control function (UPC) is implemented at the public network interface to guarantee QOS. It is assumed that such functions will also be implemented at the user network interface (UNI). Adding this function at the UNI does not significantly increase the complexity of the interface. For example, in U.S. patent application Ser. No. 08/097,683 filed Jul. 27, 1993 entitled "Control Architecture for ATM Networks" and assigned to the same assignee as the present invention, which application is incorporated herein by reference, there is described an implementation scheme which involves adding one extra counter to a standard dual leaky-bucket implementation to do the burst-access control activation and de-allocation of resources. In a RAM-based implementation this translates to adding an extra state information field to the width of the RAM (8–16 bits) per VC. The UPC function would have to be implemented at the UNI in any case when the host machine needs direct B-ISDN connection capability.

The present control strategy, which is based on the UPC function, results in a natural call admission control (CAC) as well as a burst admission control (BAC) policy. Further, this UPC based control strategy provides a common control framework for both connection oriented traffic such as voice and variable bit rate video and data, as well as connectionless traffic. The control can provide statistical guarantees on cell loss, or even guarantee arbitrarily low cell loss via appropriate choice of control parameters.

Figure 2A:
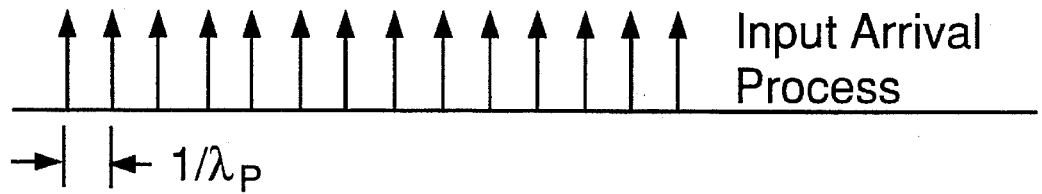
FIGS. 2(a) and 2(b) are graphical representations of the input and output signals respectively of dual leaky bucket shaper.
Figure 2B:
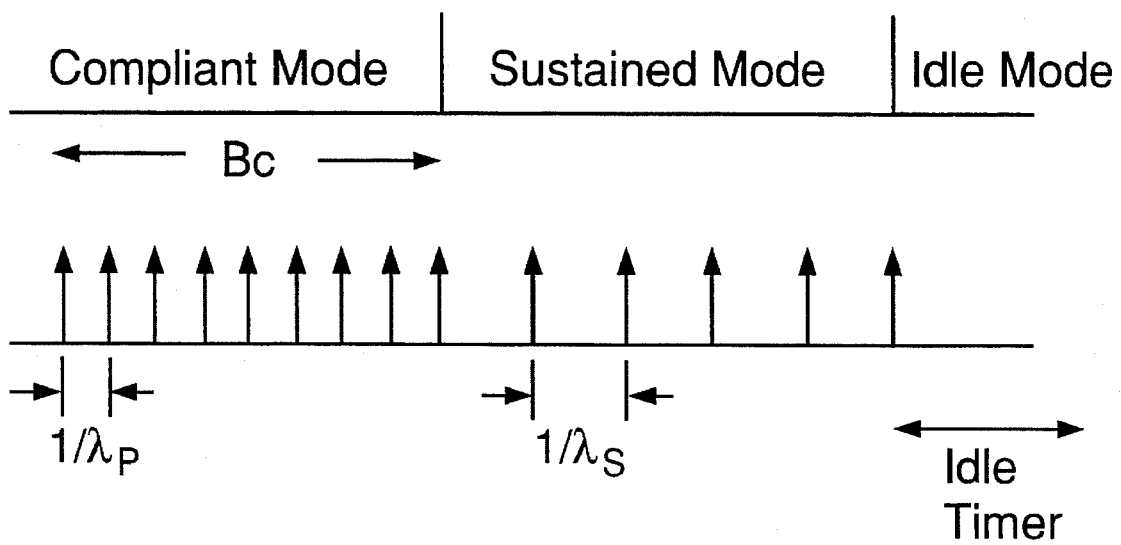

A dual leaky bucket is defined by three parameters, namely: the peak rate $\lambda_P$, the sustained rate $\lambda_S$, and the compliant burst size $B_C$. Once a source declares these parameters, the dual leaky bucket implementation of the UPC function at the UNI ensures that the source transmits no more than $B_C$ cells at the peak rate $\lambda_P$. As shown in FIGS. 2(a) and 2(b), if the burst size is larger than the compliant burst size $B_C$, then the first $B_C$ cells are transmitted at the peak rate of $\lambda_P$. The remaining cells in the burst are only transmitted at the sustained rate $\lambda_S$ which can at most be equal to the peak rate. Hence, once the three parameters of the UPC function are known, the switch can determine a worst case traffic profile for the offered traffic. Based on this worst case traffic profile, the switch can decide to either accept the call, reject the call, or accept the call after suitably modifying the declared UPC parameters.

Figure 3:
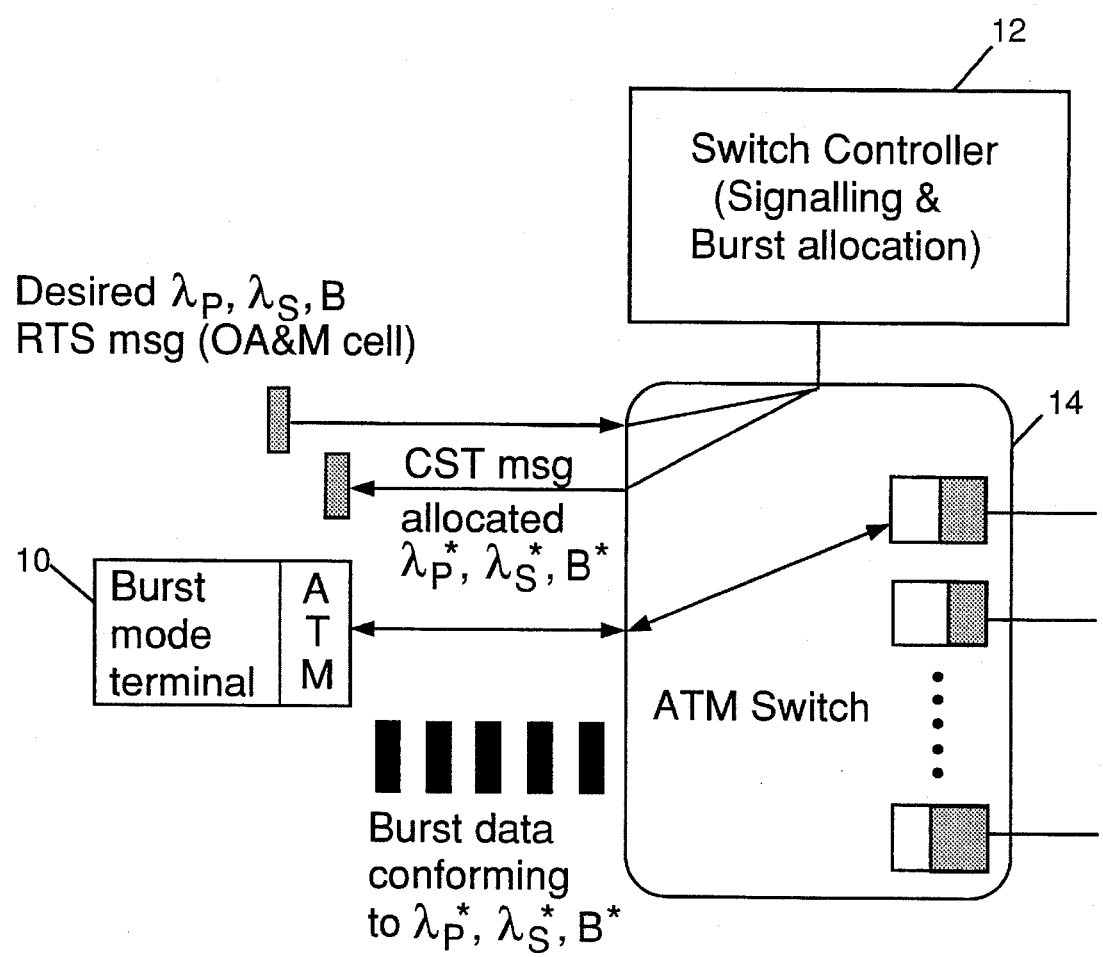
FIG. 3 is a schematic representation of a UPC based burst level control in an ATM network.
Figure 4:
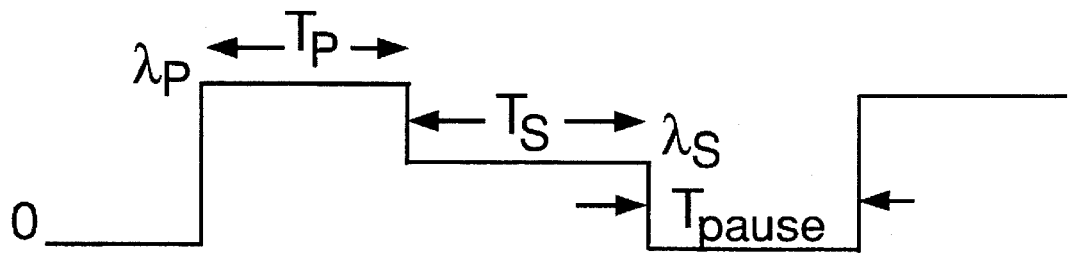
FIG. 4 is a graphical representation of an output profile of a dual leaky bucket.

FIG. 3 is a schematic representation of a UPC based burst level control in an ATM network. For example, consider a link where N calls/bursts are in progress. Call i(i=1,2, ... N) has UPC parameters $\lambda_P^i$, $\lambda_S^i$ and $B_C^i$. Let L be the number of buffers at the switch port that has a link capacity C. Upon receipt of a request for the admission (request to send (RTS) message) of a new call or a burst (from a call that has already been established) with UPC parameters $\lambda_P^{N+1}$, $\lambda_S^{N+1}$ and $B_C^{N+1}$, it is possible to determine the new cell loss probability $P_{loss}$ on a per call basis, if this call is admitted. The new call can be accepted if it does not compromise the QOS for calls already in progress. If the new call or burst cannot be admitted because the QOS for existing calls will be compromised, it is possible to compute a new set of UPC parameters $\lambda_P^*$, $\lambda_S^*$ and $B_C^*$ which is provided by the CTS (cleared to send) message signal, that will allow the new call or burst to be be admissible. The subsequently transmitted burst data conforms to the new set of UPC parameters $\lambda_P^*$, $\lambda_S^*$ and $B_C^*$ and the burst data is admitted. Hence, through the use of the UPC parameters, it is possible to control the cell loss by controlled admission of new calls at the call level and new bursts at the burst level.

Referring to FIG. 3, burst mode terminal 10 provides to switch controller 12 a RTS (request to send) message containing the parameters peak rate $\lambda_P$, sustained rate $\lambda_S$, and compliant burst size $B_C$ of the burst data packet to be sent. Switch controller 12 determines whether the network (not shown) can handle the data. If the network is able to handle the data, the burst data is connected to the network via ATM switch 14. If the network is unable to handle the data with the proposed parameters, the switch controller sends a CTS (cleared to send) signal to the burst mode terminal including revised parameters $\lambda_P^*$, $\lambda_S^*$ and $B_C^*$ which if the burst data packet conformed to these revised parameters, the data would be admitted to the network via ATM switch 14. Subsequent burst data is transmitted from burst mode terminal 10 conforming to the revised parameters.

The switch controller 12 as described below considers the class of traffic, the guaranteed QOS, and the existing traffic of the network in determining the revised parameters. Alternatively, the burst mode terminal can send burst data, without an RTS message, in which case the switch controller must determine whether the burst data can be admitted or whether the parameters must be changed.

In a variation of the above described negotiation method of changing the parameter values of the burst data, it is possible for the burst mode terminal to select new parameter values, without receiving revised parameters from the switch controller, when the data is not admitted by the switch controller. Such an arrangement, while possible, is undesireable since unlike the situation when the revised parameters are provided, there is no certainty that the new parameters selected by the burst mode terminal will result in the data being admitted, thereby further delaying admission of the data to the network.

The "neogtiation" where the switch controller provides revised parameter values which if used by the burst mode terminal will assure admission of the data to the network, provides the most timely method of adjusting the burst data parameters.

As mentioned above, the control can be implemented at the call level as well as at the burst level based, on the traffic class. If the control is implemented at the burst level also, then resources are deallocated if the source or VC becomes inactive. When a source becomes active again, the resources are restored through a fast reservation protocol (FRP).

The proposed framework uses the same UPC parameters for all the five traffic classes. However, by proper choice of control parameters it is possible to either enable or disable the controls. This makes the implementation simple since it is necessary to be concerned with only a single qualitative control mechanism for all traffic classes. Associated with this control is a timeout function with timeout parameter To, which is used to detect inactivity of sources or VCs so that resources allocated to these VCs can be deallocated in the event the VC becomes idle.

1. Class 1 Traffic: Isochronous or CBR traffic.

This class consists of isochronous traffic whose QOS requirements include low delay, low delay jitter and low cell loss. For this traffic class, set $\lambda_P = \lambda_S$ and $B_C = 1$ and the timeout parameter $T_O = \infty$. That is, a class 1 VC is treated as generating one long burst, with a deterministic cell arrival rate of $\lambda_P$. Thus, the burst level control is never invoked. In this case the call admission control admits calls based on its peak rate, and the bandwidth available to this traffic class. However, the same resource allocation scheme as the one used at the burst level is used here.

2. Class 2 Traffic: Stream type VBR traffic.

This class has the QOS requirements of low delay, low delay jitter but can tolerate moderate cell loss. Class 2 traffic is generally bursty in nature and hence is amenable to a certain degree of statistical multiplexing. There are a few possible approaches to mapping the QOS requirements of this class to a set of UPC parameters. One approach is to set parameters as for the CBR source ($\lambda_P = \lambda_S$), but with appropriate statistical multiplexing rules at the call admission control level. A second option is to use all three parameters corresponding to expected application peak rate, sustained rate and burst duration, and then adaptively change these parameters every $T_0$ seconds. Such changes may be activated either by the terminal or by the switch, in response to local and global conditions respectively. Considering for example VBR MPEG video, the first mode of operation simply involves selection of peak bit-rate per picture or group-of-pictures (GOP), depending on coded buffering capabilities. In the second mode, higher statistical multiplexing efficiency could be achieved by setting the peak rate to that expected for I-frames, sustained rate equal to that of a GOP, and $T_0$ equal to a GOP interval. In this case, the switch controller could monitor traffic from several such VBR sources and adaptively set parameters from GOP to GOP, taking into account occasional global congestion due to non-stationary behavior. This mechanism could also support burst-gaping for multiple video sources, thus providing a smoother traffic flow into the network.

3. Class 3 Traffic: Statistical data traffic.

This class has QOS requirements of low-to-moderate cell loss, low latency, but with no stringent delay constraints. Such traffic streams are bursty with a low peak rate to link speed ratio, and hence are very amenable to statistical multiplexing. Conventional interactive/transaction data is included in this traffic class. The traffic class can also be used to provide, either connection oriented or connectionless best effort service, with the difference that a certain bound on the maximum cell loss can be guaranteed. This traffic class attempts to multiplex VCs on a statistical basis, with moderate risk of cell loss, but provides high utilization and low latency. In order to realize reasonable gain in statistical multiplexing, it is necessary to ensure that a large number of streams are being multiplexed, with the individual source intensities being a small fraction of the total capacity allocated to this class. To ensure that the conditions for statistical multiplexing are met, it is assumed that this class has a default set of UPC parameters, that are chosen to ensure the success of statistical multiplexing. When a VC chooses this class, no negotiation need be conducted between the source and the switch. If the offered traffic fails to conform to the default UPC parameters, the traffic will be automatically shaped at the user interface, thereby ensuring conformance. Nonconforming cells are tagged using the CLP bit in the ATM header. The switch can monitor the offered traffic in this class, and decide if new connections should be accepted or rejected. If the statistical gain reduces, the switch can allocate more bandwidth to this class if available. If queue overflow occurs, the tagged cells can be dropped first to relieve congestion. In addition a back-pressure mechanism is used to slow class 3 traffic from immediate upstream nodes on a link by link basis. At the same time the sources are informed to reduce their rate, either through the FECN bit in the ATM header, or through a backward congestion notification cell (BECN). The back-pressure control is not intended to propagate its effect all the way back to the source, but to only cope with congestion locally, until the FECN or BECN signals become effective.

4. Class 4 traffic: Low latency—low loss traffic.

This class has the QOS requirements of low latency, low cell loss and moderate to high throughput. Such traffic streams are also bursty but with a moderate peak to link speed ratio. Applications such as distributed computing and simulation, are expected to fall into this traffic class. The traffic characteristics and QOS requirements of this traffic class makes it difficult to achieve good statistical gain and at the same time ensure low loss. To circumvent this problem, statistical multiplexing with low loss to guarantee low cell loss is used. Since this can lead to low utilization of the link (i.e., a low statistical gain), resources are deallocated when class 4 VCs are idle. When idle VCs become active, a fast resource reservation protocol is used to restore the resources. This ensures that the link utilization is high while maintaining the cell loss and latency low.

When a new class 4 VC originates, the VC declares its UPC parameters. The switch accepts the call with modification to the UPC parameters if necessary. During the course of a session, if the VC becomes idle for a time $T_O$, the resources are deallocated. The deallocated resources can now be allocated to other VCs. When the VC becomes active, that is, it has a new burst to transmit, it transmits the burst using the old UP C parameters, that it negotiated before. The switch detects the new activity, and determines if the old UPC parameters that the newly active VC is using can be sustained. If the old UPC parameters cannot be sustained, the switch instructs the VC to use a new set of UPC parameters. The VC can either use this new set of UPC parameters, or back-off and try later. Note that the burst level control is implicit and the control attempts to minimize the delay in admitting new burst from inactive VCs. In fact, the burst admission delay is a crucial QOS parameter for this traffic class. Further, since the individual burst sizes in this class are not likely to be large, the new UPC parameters will not effect the current burst, but will only be applied to succeeding bursts. One can view this class as one with a dynamic UPC renegotiation capability. Because of the fast reservation protocol, low latency, low loss and moderate throughput can be guaranteed to this class. In fact, it is possible to transport motion video frames using a burst mode of transmission in this class. This is of special interest in providing services such as video on demand.

A necessary requirement to the providing a guaranteed grade of service to this class is the notion of some form of fair queueing or Asynchronous Time Sharing (ATS) of bandwidth at the cell level to each of this traffic classes. ATS involves breaking the link bandwidth into chunks and a service discipline that ensures that on an average the bandwidth requirement is guaranteed for each class. For example if given a frame of N cells, the server ensures that each traffic class will be served for at least $N_i$ cells in a given frame or less (if class i contains less than $N_i$ cells in a given frame) in a work-conserving manner, where the sum of $N_i$ is equal to N. When a new class 4 VC originates, the VC declares its UPC parameters. The switch accepts the call and recomputes the ATS bandwidth allocated to this type at the cell level. The delay for this class is minimized by ensuring that enough bandwidth is allocated to this particular class so that the probability of a burst being admitted is high and then using fair queueing techniques to give the unused bandwidth to other classes when this class is inactive.

5. Class 5 Traffic: Bulk data transfers.

This class has the QOS requirements of high throughput and very low cell loss but can tolerate moderate to high end-to-end delays. This class of transport is especially applicable, when the burst sizes are so large that the actual transmission time would be comparable to, or larger than, the admission delay. Note that if a sources has several large bursts to transmit it can pipeline its requests. While this class uses the FRP protocol that has been proposed in the past, it differs in two important aspects. Firstly, it is applicable to only class 5 traffic. Secondly, the present invention makes use of the three UPC parameters. This traffic class will be used by applications such as file transfers and image retrievals, that require a large amount of data to be transferred. Such applications require a high throughput with low loss, but can tolerate some delay. Because, bursts can be very large, they can place a large load on the network for significant periods of time, leading to large cell loss. Hence, the philosophy here would be that it is better to block the burst at the beginning, than to accept the burst and jeopardize bursts that are already in progress. This traffic class uses an explicit burst level control, where the UPC parameters are negotiated for each new burst, using the fast reservation protocol. At the end of the burst the VC is quickly timed out, before it can begin a new burst. When the VC requires transmission of another burst, it has to make a new request. Transmission of the new burst will commence only after the necessary resources have been allocated. If the burst size exceeds the negotiated compliant burst size $B_C$, the remaining burst is transmitted at the sustained rate $\lambda_S$. The VC however, can make a request, to be able to transmit the remaining burst at the peak rate $\lambda_P$. This class introduces admission delay for each new burst. However, once a VC commences transmission, it receives a high throughput delivery at very low cell loss.

Having described a traffic control framework designed to maintain specified QOS levels over a range of anticipated services, now a traffic control framework will be described which ensures that the specified QOS levels are maintained during periods of network overload, both short and long-term.

At the time of call set up, each VC declares the UPC parameters of its associated source, based on a limited knowledge of its traffic characteristics. Assume that the source expects its packet size to be of length $B_C$. For example, in most transport protocols, the maximum length of the transport packet data unit (PDU) is fixed. In such cases one choice would be to set Be equal to the maximum PDU size. Further, assume that the transmitter pauses for a time $T_{pause}$ before the next packet can be transmitted. Let the source also request for a peak transmission rate $\lambda_P$. In this instance the sustained rate $\lambda_S$ can be chosen such that the sustained rate counter attains a value of zero before the next burst commences. That is, $$\frac{B_C}{\lambda_P}(\lambda_P - \lambda_S) = \lambda_S T_{Pause},$$

giving $$\lambda_S = \frac{B_C \lambda_P}{B_C + \lambda_P T_{Pause}}.$$

The compliant burst size is set equal to $B_C$. Note that the required sustained rate decreases as the pause $T_{pause}$ increases. If the sustained rate is chosen too small, the sustained rate counter will not count down to zero before the next packet is ready for transmission. This will result in an increase in transmission time for the next packet. Choosing a larger value for the sustained rate will not impact the performance of the source, but will result in a lower statistical multiplexing gain, which would reflect in higher transmission costs. If an average rate is defined as $$\lambda_A = \frac{B_C}{T_P + T_{Pause}},$$

then, $\lambda_A = \lambda_S$.

To provide guarantees of QOS levels, the network must have some knowledge about the characteristics of the offered traffic. The UPC parameters arc intended to provide this characterization to the network. The dual leaky bucket at the source shapes the source traffic based on the negotiated UPC parameters, while the policer (or switch controller) at the switch checks for conformance with the declared UPC parameters. While this shaping process makes the source traffic more predictable, the three UPC parameters do not fully capture the characteristics of the source traffic, and hence the output process of the shaper is not completely deterministic. In particular, it can only be certain that the source will transmit no more than $B_C$ cells at the peak rate $\lambda_P$. The remaining two states, namely the time spent in the sustained mode (and thus transmitting at the rate $\lambda_S$), or the time spent in the pause or idle mode (and thus not transmitting), are indeterminate. The time in the pause mode can however be bounded by using a timeout of length $T_O$. If the pause period exceeds a time $T_O$, the corresponding VC or source can be declared idle and the resources can be deallocated.

Figure 5A:
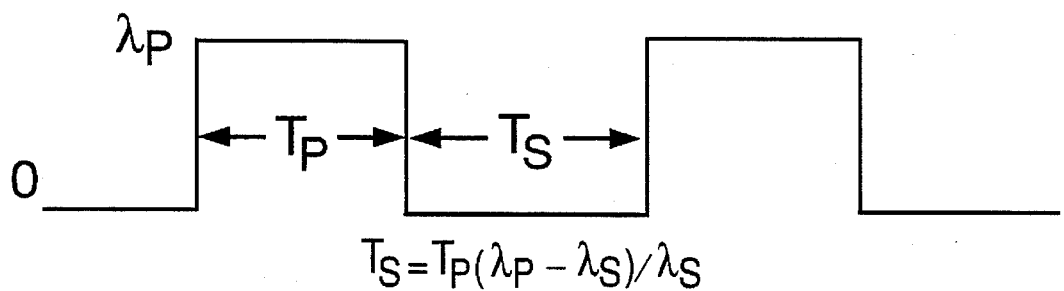
FIG. 5(a) is a graphical representation for an output profile of a two state model of a dual leaky bucket.
Figure 5B:
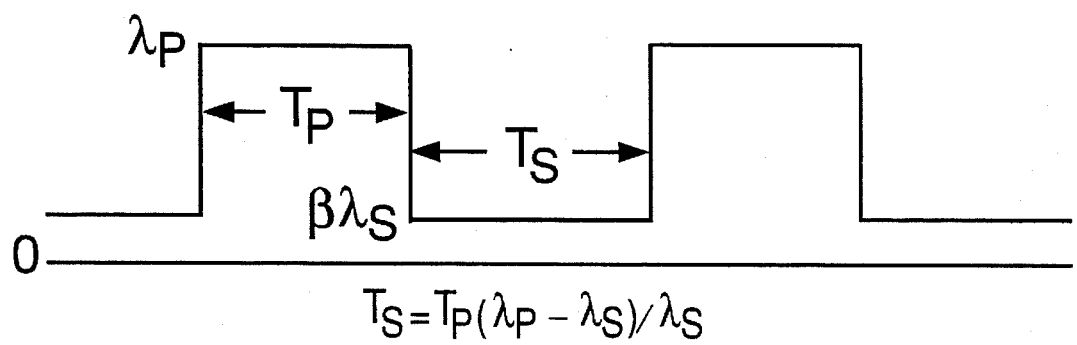
FIG. 5(b) is a graphical representation of an output profile of a modified two state model of a dual leaky bucket in accordance with the present invention.

For statistical multiplexing of bursty sources a model is needed to characterize the source traffic based on the declared UPC parameters. The simplest model is a two state model as shown graphically in FIG. 5(a), where the source transmits at the peak rate $\lambda_P$ (peak rate mode) for a time $T_P = B + C/\lambda_P$, and pauses for a time $T_S = T_{min} = T_P(\lambda_P - \lambda_S)/\lambda_S$ (during which time no cells are transmitted), such that the average rate $\lambda_A$ over a period $T_P + T_S = \lambda_S$. A limitation of this model is that, while the model assumes that the source does not transmit during the pause period, it could in fact be transmitting at the sustained rate $\lambda_s$ for an unspecified length of time. Any call or burst admission control policy based on this model can thus be optimistic and admit more calls or bursts than can be sustained at the required QOS. In order to overcome this limitation, a modified two state model such as shown graphically in FIG. 5(b) is used, where it is assumed that the source can be in one of two modes or states, a peak rate mode or a sustained rate mode. In the peak rate mode, which lasts for a time $T_P=B_C/\lambda_P$, the source transmits $B_C$ cells (equal to the compliant burst size) at the peak rate $\lambda_P$. This is followed by a transition to a sustained rate mode of mean length $T_S=T_{min}=T_P(\lambda_P-\lambda_S)/\lambda_S$, during which time the source transmits at a rate $\beta\lambda_S(0<\beta<1)$. Note that if $\beta=0$ the result is the original two state model. The modified two state model results in a conservative call-burst admission policy for the following reasons:

Consider the case when $\beta=1$:
1. the maximum time spent in the peak rate mode is $T_P=B_C/\lambda_P$. This provides an upper bound on the number of cells that can be transmitted at the peak rate.
2. After completing the transmission of $B_C$ cells at rate $\lambda_P$, the actual source can switch to one of three states. The source
   (a) Case 1: remains in a pause or idle mode for an indeterminate period of time, during which time it does not transmit any cells;
   (b) Case 2: transmits at a rate less than or equal to the sustained rate $\lambda_s$ for an indeterminate period of time;
   (c) Case 3: transmits at some rate less than or equal to the sustained rate $\lambda_s$ for some time greater than $T_S$ assumed by the model, and then switches to an idle mode.

The modified two state model however assumes that, following the transition from the peak rate mode, the source remains in the sustained rate mode for a time $T_S=T_P(\lambda_P-\lambda_S)/\lambda_S$ transmitting at the sustained rate As, and then switches back to the peak rate mode. If case 1 occurs, then the source is timed out after a time $T_O$ and the resources are deallocated. On the other hand, if the actual source pauses or idles for a time $T_{Pause}$ less than the time out interval $T_O$, but greater than the time spent in the sustained period $T_S$ assumed by the model, the impact of the model on the call admission policy will be slightly conservative. That is, if it were known that the source actually switched to an idle mode in between the peak rate modes, more calls could have been admitted. If the pause or idle period $T_{Pause}$ is shorter than $T_S$, then the compliant burst size for the next packet is reduced. That is, fewer cells can now be transmitted at the peak rate $\lambda_P$. Since the model assumes that the compliant burst size is $B_C$, once again the impact of the model on the call admission policy is conservative.

If case 2 or case 3 occurs, then, in a time $T_P+T_S$ fewer cells are actually transmitted by the source than what the model assumes, resulting in a call admission policy that is more conservative. While a conservative call admission policy ensure that the desired QOS is not compromised, it results in a reduced utilization of the link bandwidth as well.

Thus, while the UPC parameters cannot precisely characterize the behavior of the sources, it is possible to define a traffic profile that will result in a call admission policy that is more likely to be conservative (than optimistic), but will ensure the QOS is not compromised. The call admission policy can be made more optimistic by reducing the value of $\beta$, but at the risk of admitting more calls than is supportable at a given QOS.

Each switch in the ATM network is modeled as single stage multiplexer with L buffers, and a link bandwidth C. Each admitted call i has UPC parameters $\lambda_P^i, \lambda_S^i, B_C^i$. New calls are admitted only if the resulting probability of cell loss $P_{cell}$ will not exceed the given value $\epsilon$. The number of buffers L is assumed to be small enough, so that they do not introduce any significant queueing delay.

The call-burst admission control policy is implemented at the call level as well as at the burst level respectively. Assume that there are a maximum J sources, where each source i has UPC parameters $\lambda_P^i, \lambda_S^i, B_C^i$. The call admission policy is based on the modified two state model. Each source or VC is assumed to be in one of two states. It can be in an ACTIVE state, or it can be an IDLE state. While in the active state, the VC is either in a peak rate mode or a sustained rate mode. In the peak rate mode the VC transmits $B_C$ cells equal to its declared compliant burst size at the peak rate $\lambda_P$, which lasts for a time $T_P$. In the sustained rate mode the VC is assumed to transmit at a rate $\beta\lambda_S(0<\beta\leq 1)$. The sustained rate mode lasts for a time $T_S=T_P(\lambda_P-\lambda_S)/\lambda_S$. If the VC pauses (i.e., the VC does not transmit any cells) for a time greater than $T_O$, the source or VC is declared as being IDLE. All admitted calls require that the cell loss $P_{cell}$ be less than $\epsilon$. Assume that j calls are in progress. Let a request to admit a new call, or a new burst (from a VC that has been timed out) arrive. Based on the declared UPC parameters of the new call or burst, as well as those calls already in progress, the call-burst admission control admits (or rejects) the new call or burst, if the resulting cell loss probability $P_{cell}$ is less (greater) than some desired value $\epsilon$. Once the call is admitted, if the source or VC associated with the call is idle or inactive for a time greater than $T_O$, the VC is timed out (and declared IDLE) and the resources are deallocated. When the timed out or IDLE VC has a new packet to send, it is subjected to a burst admission control (BAC). The burst admission control policy either restores the resources and admits the burst or blocks the burst, based on the number of VC that are currently active and their respective UPC parameters. The new burst from a timed out VC is accepted only if the guaranteed cell loss rate $P_{cell}\leq\epsilon$ can be maintained. Once the burst admission control accepts a packet from a VC that has been declared to be IDLE, succeeding packets from the same VC are admitted without being subject to the burst level control, unless the VC is timed out again. A VC that is blocked can retry after an exponential back-off of length $T_{Boff}$.

Assume that source i(i=1,2, . . . J) has UPC parameters $\lambda_P^i, \lambda_S^i, B_C^i$. The source is modeled as a binary source. The source spends a time $T_P^i$ in the peak rate mode, when it transmits $B_C^i$ cells at the peak rate of $\lambda_P^i$. Each peak rate mode is followed by a sustained rate mode, which lasts for a time $T_S^i$, when it is assumed to be transmitting at a rate $\beta\lambda_S^i$.

Thus the time spent in the peak rate mode is given by:

$$T_P^i = \frac{B_C^i}{\lambda_P^i} . \qquad (1)$$

The time spent in the sustained rate mode is given by:

$$T_S^i = \frac{T_P^i(\lambda_P^i - \lambda_S^i)}{\lambda_S^i} . \qquad (2)$$

Thus the probability $P^i$ source i is in the peak rate mode is $$P^i = \frac{T_P^i}{T_P^i + T_S^i} . \qquad (3)$$

The probability source i is in the sustained rate mode is given by:

$$P^{-i} = 1 - P^i = \frac{T_S^i}{T_P^i + T_S^i} . \qquad (4)$$

The mean rate of transmission $R^i$ of source i is $$R^i = P^i\lambda_P^i + P^{-i}\lambda_S^i. \qquad (5)$$

A call-burst admission control policy that uses the UPC parameters, is simple to implement, can handle heterogeneous sources, and the estimated cell loss probabilities are close to the observed cell loss probabilities. The call-burst admission policy is based on a heuristic that estimates the cell loss probability with reasonable accuracy.

If the number of buffers is L and the link capacity is C, the time to empty the L buffers $T_E=L/C$. Assume that time is slotted and each time slot is of length $T_E$. The number of cells $n_P^i$ that VC i(i=1,2, ... ,j) will generate during a time slot while in the peak rate mode is $T_E\lambda_P^i$. The number of cells $n_S^i$ that VC i will generate during a time slot while in the sustained rate mode is $T_E\lambda_S^i$. Let $n_T^i$ be a random variable that represents the number of cells VC i will generate during a time slot of length $T_E$. Further, let $$N_T(j) = \sum_{i=1}^{i=j} n_T^i, \quad (6)$$

where $N_T(j)$ represents the total number of cells that arrive in a time slot of length $T_E$ given j VC have been admitted. Note that the $n_T^i$ are random variables. Assume that these $N_T(j)$ cells arrive as a batch at the beginning of each time slot. Since the multiplexer can serve L cells in every time slot of length $T_E$, if the number of cells $N_T(j)$ that arrive in any time slot is $\leq L$ no cells will be lost and the queue will be empty at the beginning of each slot. If $N_T(j)>L$, then $N_T(j)-L$ will be lost on arrival. Now $N_T(j)$ is the sum of j random variables. That is, if j(j=1, 2, ..., J) call are in progress $$N_T(j)=n_T^1+n_T^2+\ldots+n_T^j$$

where, $$n_P^i=T_E\lambda_P^i \text{ with probability } P_i \quad (7)$$

$$n_S^i=T_E\lambda_S^i \text{ with probability } \overline{P}_i \quad (8)$$

and $$n_T^i=n_P^i+n_S^i.$$

From (7 and 8) it is possible to determine the probability distribution function $$P[N_T(j)=m]=P(m|j),$$

were P(m|j) is the probability that m cells arrive at the beginning of a time slot, given j calls have been admitted. Using a generating function approach results in $$f_{N_T}(z) = \prod_{i=1}^{i=j} (P^i z^{n_P^i} + P^{-i} z^{n_S^i})$$
$$= C_0 + C_1 z + C_2 z^2 + \ldots$$

where, $P[N_T(j)=m]=C_m$. The coefficients are evaluated when j calls are in progress. Define cell loss probability when j calls are admitted as $$P_{cell} = \frac{\sum_{k=0}^{k=\infty} (k-L)^+ P(k|j)}{\sum_{k=0}^{k=\infty} kP(k|j)}. \quad (9)$$

where, $P(k|j)=C_k$. The numerator gives the average number of cells lost in a time slot. The denominator gives the average number of cells that arrive in a time slot. When a new call or burst arrives, the call admission policy computes the value of $P_{cell}$ (given by equation 9) as a result of admitting this new call. If $P_{cell}$, thus computed is less than the target value $\epsilon$, the call or burst is admitted. Otherwise, the call or burst is rejected.

The admission policy based on equation (9), is very conservative, since it assumes that the cells arrive according to a batch process. In reality, the arrivals would be spread over the time slot. With the result, the cell loss probability $P_{cell}$ estimated by equation (9) will be much higher than the actual cell loss probability. This results in the admission of fewer calls or bursts, leading to reduced utilization and large admission delays. It is possible however to use equation (9) as a lower bound for accepting calls.

The call admission policy will be improved as follows. Assume a fluid model where the cells arrive like a fluid over the entire length of every time slot (rather than as a batch at the beginning of each time slot). In this case, if the number of cells $N_T(j)$ that arrive over the time slot of length $T_E$ is less than L, not only are no cells lost, but no queueing results. On the other hand, if more than 2L cells arrive during a time slot, L cells are served, L cells are queued, and the remaining $N_T(j)-2L$ cells are lost. This model however, requires tracking of the evolution of the queue to determine the cell loss probability. Since the computation of $P_{cell}$ should be simple so that the cell loss can be computed in real time, the following heuristics are used. Assume that the multiplexer queue will be in one of two states. The queue is in a state of under-load (during which time the queue is empty for most of the time) or it is in a state of overload (during which time the queue is full and cells are being lost). Note that if it is assumed that the cell arrival process is a fluid model, the queues will be empty as long as the instantaneous arrival rate is less than the link capacity C. Also assume that the transitions from an under-load state to an overload state, and vice versa occurs in a very short time. This would be true if the link speeds are high, and the sources are bursty with high access or peak rates. A transition can occur from an empty queue to a full queue (leading to loss) only if the combined instantaneous arrival rate is greater than twice the link capacity. That is, cell loss occurs only if more than 2L cells arrive in a time slot. Assume that the performance of such a system (with link capacity C and L buffers) can be approximated by an equivalent slotted system with link capacity 2C and with 2L buffers, where each time slot $T_E=2L/2C=L/C$, and the cells arrive as a batch at the beginning of each time slot. In such a system, the queue is always empty at the beginning of each time slot. If the number cells $N_T(j)$ that arrive at the beginning of a time slot is greater than 2L, then $N_T(j)-2L$ cells are lost. Approximate the cell loss in such a system as, $$P_{cell} = \frac{\sum_{k=0}^{k=\infty} (k-2L)^+ P(k|j)}{\sum_{k=0}^{k=\infty} kP(k|j)}. \quad (10)$$

The cell loss predicted by equation (10) is optimistic, and the call admission policy can admit more calls than can be sustained at the required QOS or cell loss. To correct this fact a second constraint is introduced. From Equation (5) the mean rate of transmission of source i is $$R^i=P^i\lambda_P^i+P^{-i}\lambda_S$$

The second constraint requires that, after admitting the new call or burst, the combined mean arrival rate must be less than the link capacity. That is, $$R = \sum_{i=1}^{i=j} R^i < \alpha C (0 < \alpha \leq 1). \quad (11)$$

Thus, given j calls have been admitted, when the (j+1)th call arrives (or when the (j+1)th VC makes a transition from an idle to an active state), the cell loss probability $P_{cell}$ given by equation (10) and the combined mean arrival rate R from equation (11) are computed. The call or burst is admitted only if $$P_{cell} < \epsilon \text{ and } R < \alpha C.$$

The advantage of this call admission policy is that it is simple, and it can applied to heterogenous traffic sources. The coefficients $C_m = P(m|j)$ are obtainable in an incremental fashion, each time a new call (or burst) is admitted or released (or timed out). Assume that j calls are in progress and the coefficients $C_m (m=0,1,2,\ldots)$ are known. If the (j+1)th call or burst is admitted, with model parameters $n_P^{j+1}$, $n_S^{j+1}$, $P^{j+1}$, then the new coefficients are given by:

$$C_m^{new} = C_{m-n_j^{j+1}}^{old} p^{j+1} + C_{m-n_j^{j+1}}^{old} \bar{p}^{j+1}.$$

By rewriting equation (10), only coefficients from $C_0$ to $C_{2L}$ need be determined.

A comparison of the performance of a UPC based call acceptance policy with a policy that uses only peak rate allocation under two different source work-loads was performed. The first workload represents a typical distributed computing application while the second workload represents an image retrieval application. The performance was measured of a multiplexer running at C=150 Mbits/sec., with L=500 buffers. Table 2 lists the source workload characteristics.

TABLE 2

| Parameter | Workload 1 | Workload 2 |
| --- | --- | --- |
| Number of sources | 50 | 30 |
| Peak Rate $\lambda_C$ | 10, 25, 45 Mbits/sec | 10, 25, 45 Mbits/sec |
| Sustained Rate $\lambda_S$ | 7.5, 10, 15 Mbits/sec | 7.5, 15, 25 Mbits/sec |
| Mean packet size $B_C$ | 10 Kbytes | 64 Kbytes |
| Mean number of packets per burst | 8 | 16 |
| Mean Interpacket gap Exponential | 3 msec. | 3 msec. |
| Mean Interburst gap Exponential | 30 msec. | 3 sec. |
| Time out interval | 10 msec. | 10 msec. |
| Desired cell loss probability $P_{cell}$ | <1E-6 | <1E-6 |

The network is modeled as a multiplexer, with a link capacity of 150 Mbits/second, and 500 cell buffers. Further, the call admission policy based on equation (10–11) admits the first packet after a timeout only if it can ensure that the cell loss probability will be less than $1.0 \times 10^{-6}$. For the examples shown, $\beta=0.5$ and $\alpha=0.9$. For the peak rate allocation scheme, a new packet (after a timeout) is admitted only if the sum of the peak rates of all admitted source is less than 150 Mbits/second. Note that in the peak rate allocation scheme, the sustained rate is equal to the peak rate. The results for the first workload when the packet size is fixed at 10Kbytes are presented in Table 3. The results for the second workload with a fixed packet size of 64Kbytes are presented in Table 4. In each case, the first line represents the UPC control scheme and the second line represents the peak rate allocation scheme. As shown, the UPC based scheme results in a higher link utilization than the peak rate control.

TABLE 3

| Peak Rate Mbs | Sustained Rate Mbs | Cell Loss | Link Utilization | Mean Transmission Time (msec) | Mean Admission Delay (msec) | Number of Admitted Sources |
| --- | --- | --- | --- | --- | --- | --- |
| 10 | 7.5 | <1E-6 | 89% | 8.8 | 86 | 21 |
| 10 | 10 | 0 | 63% | 8.0 | 112 | 14 |
| 25 | 10 | <1E-6 | 81% | 6.4 | 136 | 13 |
| 25 | 25 | 0 | 38% | 3.2 | 147 | 5 |
| 45 | 15 | <1E-6 | 53% | 3.9 | 270 | 6 |
| 45 | 45 | 0 | 28% | 1.8 | 162 | 3 |

TABLE 4

| Peak Rate Mbs | Sustained Rate Mbs | Cell Loss | Link Utilization | Mean Transmission Time (msec) | Mean Admission Delay (msec) | Number of Admitted Sources |
| --- | --- | --- | --- | --- | --- | --- |
| 10 | 7.5 | <1E-6 | 68% | 66.1 | 27 | 18 |
| 10 | 10 | 0 | 41% | 51.2 | 28 | 14 |
| 25 | 10 | <1E-6 | 76% | 32.1 | 152 | 8 |
| 25 | 25 | 0 | 46% | 20.5 | 52 | |
| 45 | 15 | <1E-6 | 64% | 18.7 | 252 | 4 |
| 45 | 45 | 0 | 52% | 11.6 | 92 | 3 |

It has been observed that the UPC based control can achieve significant statistical gains and still ensure the promised QOS. While the UPC based control results in higher link utilization in all cases, it also leads to longer waiting times is when both the packet size and the peak rates are large. Hence, when the packet size is large and the required peak rate or thoughput is high, a peak rate allocation scheme on a burst by burst basis may be more appropriate. In the traffic control framework described above, applications such as image transfers (which have large bursts and require a high throughput), will use class 5 service, which provides control on a burst by burst basis. In all other cases, the UPC based control will deliver the promised QOS at high link utilization. While there has been described and illustrated a new UPC-based traffic control framework for ATM network where the control framework is based on providing guarantees of the offered QOS for each of five aggregated traffic classes, by means of call/burst admission control and traffic shaping of source streams using a dual leaky bucket using a single UPC mechanism to address the needs of a wide range of new applications in an integrated manner, and a new UPC-based call and burst admission control providing the desired QOS by means of a call/burst admission control and traffic shaping of source stream using a dual leaky bucket, it will be apparent to those skilled in the art that variations and modifications are possible without deviating from the broad principle and spirit of the present invention which shall be limited solely by the scope of the claims appended hereto.

What is claimed is:

1. A method of controlling traffic on an ATM network, said network having a link capacity and L buffers, comprising the steps of:

receiving a (j+1)th call from a source;

approximating the cell loss probability ($P_{cell}$) when the (j+1)th call arrives after j calls have been admitted by $$P_{cell} = \frac{\sum_{k=0}^{k=\infty} (k-2L)^+ P(k|j)}{\sum_{k=0}^{k=\infty} k P(k|j)}$$

where $P(k|j)$ equals $C_k$;

calculating the combined mean arrival rate (R) after admitting a new call by $$R = \sum_{i=1}^{i=j} R^i$$

where $R^i$ is the mean rate of transmission source i; and admitting a new call when the cell loss probability is less than a target value $\epsilon$ and the combined mean arrival rate is less than the value $\alpha C$, where $0 < \alpha \leq 1$.

2. An asynchronous transfer mode (ATM) traffic controller comprising:

means for providing data of a given service class and providing traffic parameter vectors representative of the traffic characteristics of the given service class;

switch controller means for generating a QOS vector representative of guarantees that are offered based on the given service class and for providing a revised traffic parameter vector to said means for providing data and traffic parameter vectors for changing said data for admission to an ATM network via said ATM switch means; and ATM switch means controlled by said switch controller means for admitting data to an ATM network having a link capacity C and L buffers which accepts a (j+1)th call of data after j calls of data have been admitted, when the cell loss probability ($P_{cell}$) is $$P_{cell} = \frac{\sum_{k=0}^{k=\infty} (k-2L)^+ P((k|j)}{\sum_{k=0}^{k=\infty} k P(k|j)} < \epsilon$$

where $P(k|j)$ equals $C_k$ and $\epsilon$ is a target value, and the mean arrival rate (R) after admitting a new cell is $$R = \sum_{i=1}^{i=j} R^i < \alpha C$$

where $R^i$ is the mean rate of transmission source i, and $0 < \alpha \leq 1$.

* * * * *